(12) United States Patent  
Gut

(10) Patent No.: US 9,315,340 B2  
(45) Date of Patent: Apr. 19, 2016

(54) METHOD FOR REJECTING AN ARTICLE

(71) Applicant: KRONES AG, Neutraubling (DE)

(72) Inventor: Thorsten Gut, Neutraubling (DE)

(73) Assignee: KRONES AG, Neutraubling (DE)

( * ) Notice: Subject to any disclaimer, the term of this patent is extended or adjusted under 35 U.S.C. 154(b) by 151 days.

(21) Appl. No.: 14/053,945

(22) Filed: Oct. 15, 2013

(65) Prior Publication Data

US 2014/0116842 A1    May 1, 2014

(30) Foreign Application Priority Data

Oct. 25, 2012    (DE) .......................... 10 2012 219 566

(51) Int. Cl.
| | |
|---|---|
| *B65G 47/26* | (2006.01) |
| *B65G 47/82* | (2006.01) |
| *B65G 47/46* | (2006.01) |
| *B07C 5/36* | (2006.01) |

(52) U.S. Cl.
CPC . *B65G 47/46* (2013.01); *B07C 5/36* (2013.01); *B65G 47/82* (2013.01)

(58) Field of Classification Search
CPC ...... B65G 47/46; B65G 47/48; B65G 47/844; B65G 47/845; B07C 5/08; B07C 5/16; B07C 5/083; B07C 5/3404; B07C 5/3408; B07C 2201/00
USPC .................................................. 198/368, 456
See application file for complete search history.

(56) References Cited

U.S. PATENT DOCUMENTS

| | | | | | |
|---|---|---|---|---|---|
| 3,684,073 | A | * | 8/1972 | Giles ................................ | 193/36 |
| 4,879,862 | A | * | 11/1989 | Nolte et al. ...................... | 53/438 |
| 5,540,317 | A | * | 7/1996 | Braden et al. .................. | 198/393 |
| 5,732,147 | A | * | 3/1998 | Tao ................................. | 382/110 |
| 5,979,635 | A |  | 11/1999 | Calhoun | |
| 6,822,181 | B2 | * | 11/2004 | Linton .......................... | 209/524 |

FOREIGN PATENT DOCUMENTS

| | | |
|---|---|---|
| CN | 101875440 A | 11/2010 |
| CN | 201913113 U | 8/2011 |
| CN | 102500560 A | 6/2012 |
| DE | 102010031298 A1 | 1/2012 |
| EP | 1076020 A2 | 2/2001 |
| EP | 2407846 A2 | 1/2012 |
| WO | WO-9920551 A1 | 4/1999 |
| WO | WO-03022717 A1 | 3/2003 |

OTHER PUBLICATIONS

European Search Report for Application No. EP13185154 dated Jan. 15, 2014.
Chinese Examination Report for Application No. 2013105121309, dated Jun. 19, 2015.

* cited by examiner

*Primary Examiner* — Gene Crawford
*Assistant Examiner* — Lester Rushin
(74) *Attorney, Agent, or Firm* — Marshall, Gerstein & Borun LLP

(57) ABSTRACT

A method for rejecting an article from a sequence of transported articles, wherein the establishment of a first contact between a pusher and the article to be rejected is detected by at least one measurement signal, and wherein a desired stroke is carried out for diverting the article, starting from the detected contact. Errors regarding a different lateral offset of the articles to be rejected and blind strokes caused thereby can thus be reduced.

12 Claims, 4 Drawing Sheets

METHOD FOR REJECTING AN ARTICLE

CROSS-REFERENCE TO RELATED APPLICATION

The present application claims the benefit of priority of German Application No. DE 102012219556.1, filed Oct. 25, 2012. The entire text of the priority application is incorporated herein by reference.

FIELD OF THE DISCLOSURE

The present disclosure refers to a method for rejecting an article, particularly a bottle, from a sequence of articles by means of a pusher from a conveyor belt.

BACKGROUND DESCRIPTION OF THE RELATED ART

As is generally known, defective products can be rejected from a product stream transported on a conveyor belt by so-called pushers towards at least one divert path, as is e.g. described in DE 10 2010 031298 A1. Hence, the successful diversion of an article onto a divert path can be checked by monitoring a load-dependent parameter of the pusher.

Nevertheless, the articles, such as bottles, are supplied for reasons of handling with a lateral play to guide railings provided at the input side, or the like, so that also on the pusher the articles have a different lateral offset which in conventional divert systems may e.g. be 10 mm. Since the nominal divert strokes of the pushers may be in the range of 5 mm to 15 mm, it may happen that in response to the lateral offset of the article to be rejected a stroke is carried out that is insufficient for diversion onto the desired divert path or, however, that an excessive stroke is carried out and the article is e.g. pressed against a boundary railing and thereby damaged. Likewise, individual articles might get jammed in the area of the divert system. Hence, there is the fundamental problem to ensure a reliable and gentle rejection despite the different lateral offset at nominal divert strokes which are as small as possible.

WO 99/20551 A1, for instance, suggests in this respect that a light barrier arrangement should be provided upstream of a pusher in a direction transverse to the conveying direction of the articles to be diverted. This, however, means considerable efforts in terms of equipment and does not ensure any reliable detection of the respective lateral offset in the case of articles positioned close to one another.

Hence, there is the need for a method for rejecting an article from a sequence of transported articles, wherein the aforementioned problems can be eliminated or at least attenuated with little efforts in terms of equipment, in a space-saving manner and at a high operational reliability.

SUMMARY

A measurement signal for detecting a first contact between the pusher and the article to be rejected is monitored. The article is particularly a bottle, a container, a pack, or a package piece. Furthermore, the pusher carries out a desired stroke starting from the first contact. Here, first contact means the establishment of the contact between the article and a plunger provided on the pusher, a pusher plate, or the like. It goes without saying that the first contact according to the present disclosure is established during an advance movement of the pusher towards the article.

Hence, the article can be pushed selectively towards a specific divert path, or the like. In other words, a blind stroke of the pusher, i.e. a stroke carried out by the pusher before the first contact is established with the article, can be neglected for the divert process.

The measurement signal according to the present disclosure is picked up in the area of the pusher. The contact between the plunger and the article can e.g. be established by monitoring one or plural characteristics of the pusher. Also conceivable and within the scope of the present disclosure would also be additional pressure sensors on the plunger or on a pusher plate provided on the plunger, or the like. Measurement signals of such pressure sensors could be picked up in the area of the pusher and make light barriers, or the like, superfluous that are used for measuring a lateral offset of the incoming articles.

Preferably, a total stroke for rejecting the article, starting from an inoperative position of the pusher for passing through the sequence of articles is determined individually for the article. Hence, every article can be pushed independently of its lateral offset by means of the same desired stroke onto a divert path, or the like.

Preferably, the measurement signal is periodically recorded at least within a blind stroke of the pusher towards the article. The first contact can thereby be detected reliably and automatically at a sufficient speed.

Preferably, the first contact is detected while the pusher is continuously advanced. This makes it possible to identify a load of the pusher through a resistance put up by the article to be rejected in a particularly reliable manner and to assign it to the first contact. Moreover, errors caused by drive play can be minimized.

A method wherein the measurement signal is an actual value of the pusher which is typical of the position or the movement of a plunger provided on the pusher or of a resistance put up against the plunger is also disclosed herein.

The position of the plunger could e.g. be measured by a position sensor provided on the pusher internally or externally. The movement of the plunger could e.g. be monitored by measuring the speed and/or acceleration of the plunger by means of position sensors, acceleration sensors, or the like. A resistance put up against the plunger is e.g. reflected in drive torques, current consumption of the drive provided on the pusher, or the like. Likewise, an additional pressure sensor in the area of the plunger or a pusher plate provided on the plunger could supply a measurement signal which is a measure of the resistance put up against the plunger.

Preferably, the actual value curve is compared with a desired value curve. The curves of the actual value and of the desired value shall particularly be understood within the meaning of position/time diagrams and/or a position/time table. By such a comparison it is possible to determine a load-dependent difference between actual values and desired values. Since the establishment of the contact between the plunger and the article for the extension of the plunger means a load-dependent change of state, such a change of state can be determined from the comparison of the time curve of the actual value with the time curve of the desired value, which is tantamount to the establishment of the contact.

Preferably, a desired value curve is predetermined in response to a dimension and/or the mass of the article. The desired value curve must particularly be understood within the meaning of a position/time diagram and/or a position/time table. This permits an adaption of the method in conformity with the type. For instance, an expected curve of the desired value can be adapted to a specific type of bottle. This could e.g. be a specific region of the advance movement of the pusher in which a typical curve of the measurement signal is expected. Likewise, specific load-dependent changes of the measurement signal would be possible in the case of articles having different weights. The desired value curve could e.g. comprise a typical change in the nominal current consumption of the pusher drive during a blind stroke and during ejection of the article.

Preferably, differential values are calculated from actual values and desired values corresponding in time. In other words, the actual position of the plunger is compared with a desired position curve and/or a desired position table during the advance movement. This permits a particularly simple evaluation of the comparison results.

Preferably, the differential values are compared with at least one threshold value that is typical of the establishment of the first contact between the plunger and the article. When a threshold value is reached or exceeded, the beginning of the desired stroke can be initiated in a simple and reliable manner.

Preferably, a drag error between a desired and an actual position of the plunger is calculated from the measurement signal. The drag error means a trailing of the actual position as compared with the desired position that is due to control technology. The drag error increases in a typical manner upon a step-like rise of the resistance put up against the plunger.

Preferably, the articles are glass bottles, filled plastic bottles, or beverage cans. On account of their mass such bottles are particularly well suited for the detection of the contact by means of the monitoring according to the invention of at least one measurement signal. For instance, drag errors, drive torques, or the like, change in the case of heavy articles particularly strongly, whereby the establishment of the contact between the pusher and the article can be detected in a particularly reliable manner.

Preferably, the pusher is driven by a position-controlled linear motor. The measurement signal is then particularly a position signal of the linear motor and/or represents an electrical drive performance of the linear motor. With such a configuration the pusher can be driven in a particularly simple and accurate manner and typical variations of the measurement signal upon establishment of the contact can also be detected immediately and reliably.

Preferably, the measurement signal is evaluated at periodically repeated intervals, and the start of the desired stroke is initiated within not more than 2 ms after detection of the first contact. The influence of the blind stroke on the total stroke can thus be neglected.

For instance, a variation width of ±2 mm, particularly ±5 mm, can be allowed without any problems for the nominal distance of the articles from the pusher. This permits a delivery of the articles, particularly bottles, to guide railings, or the like, with an adequate play.

BRIEF DESCRIPTION OF THE SEVERAL VIEWS OF THE DRAWING

A preferred embodiment of the invention is shown in the drawing, in which.

DETAILED DESCRIPTION OF THE PREFERRED EMBODIMENTS

Figure 1:
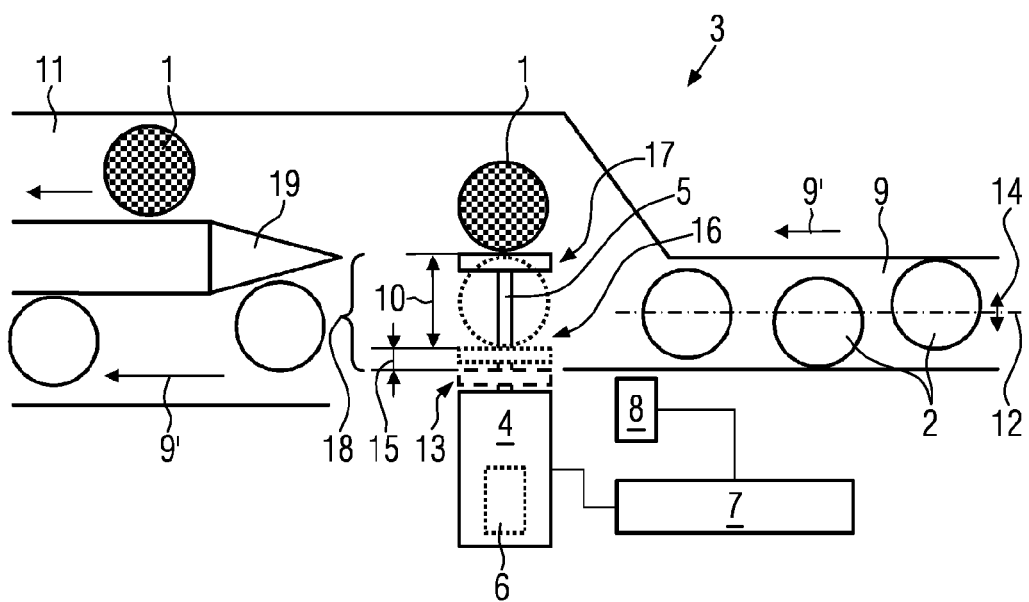
FIG. 1 illustrates a divert system for articles for carrying out the method according to the present disclosure invention.

As can be seen in FIG. 1, a divert system 3 suited for the rejection of articles 1 from a sequence 2 of transported articles, for instance bottles, comprises—in a manner known per se—a pusher 4 having a plunger 5 which is movable towards the articles 1 passing by and on which e.g. a pusher plate, or the like, may be provided. Furthermore, the pusher 4 comprises an electrically controllable linear motor 6 which is connected to a control device 7. In principle, other electronically controllable drives for the pusher 4 would also be conceivable and with in the scope of the present disclosure. Furthermore, the control device 7 is preferably connected to a light barrier 8, or the like, for identifying the articles 1 to be rejected.

The sequence 2 of articles is running standing on a conveyor belt 9 in conveying direction 9' past the pusher 4, so that for instance articles 1 detected to be defective can be pushed by a predetermined desired stroke 10 towards at least one divert belt 11 and can thus be rejected.

On the incoming conveyor belt 9, a lateral offset from an imaginary middle position 12 of the articles, e.g. between guide railings provided on the conveyor belt 9, is standard for reasons of handling the articles during transportation. That is why the articles run past the plunger 5, which is retracted into an inoperative position 13, at a nominal distance which, depending on the allowed lateral offset of the articles on the conveyor belt 9, has a variation width 14.

According to the present disclosure, the plunger 5 is moved from its inoperative position 13 drawn in broken line via a blind stroke 15 against the article 1 to be rejected up and into a contact position 16 plotted in dotted fashion. This position is defined according to the present disclosure in that a contact between the plunger 5 and the article 1, which is also plotted in dotted fashion at this place, is detected at said position. The establishment of the contact is detected with the help of at least one measurement signal, which will be explained hereinafter in more detail. Started by this contact detection, the plunger 5 performs the nominal desired stroke 10. At the end of the desired stroke 10 the plunger 5 has reached its end position 17 for rejecting the respective article 1.

Hence, the total stroke 18 of the plunger 5 for rejecting the articles 1 is individually set and/or corrected as the sum of the desired stroke 10 and the blind stroke 15 for each article 1 to be rejected.

To reduce the desired stroke 10 needed for rejection, a deflection wedge 19, which is just outlined schematically, may be provided downstream of the pusher 4. Desired strokes 10 can then also be used that are smaller than the diameter of the articles 1 to be rejected.

Figure 2:
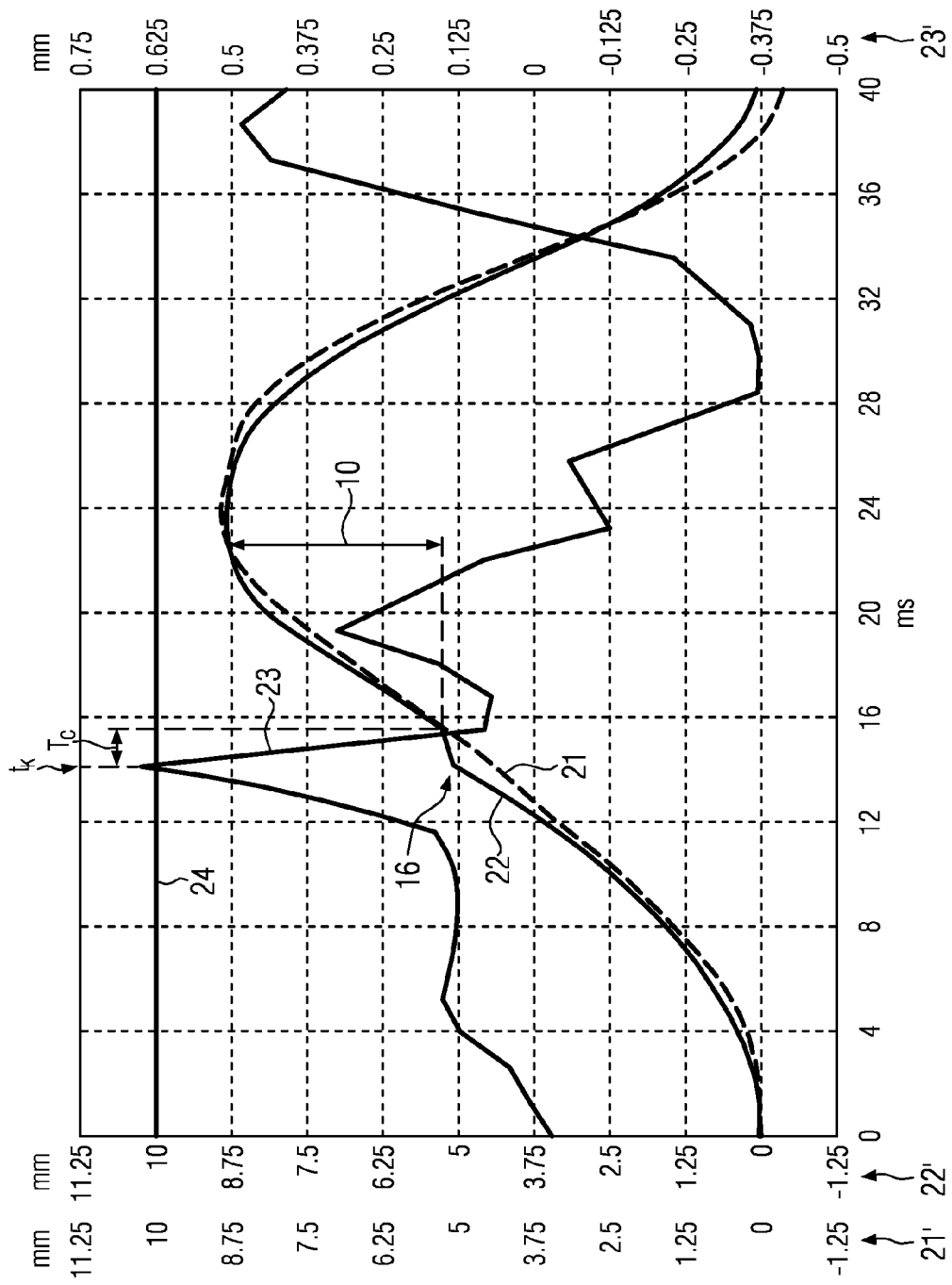
FIG. 2 illustrates a time curve of an actual value, a desired value and a characteristic calculated therefrom.

FIG. 2 illustrates an example of the time curve of the actual position of the plunger 5 before, during or after the establishment of the first contact with an article 1 to be diverted. The time curve of the actual value 21 of the plunger position is here drawn as a broken line, the time curve of a desired value 22 of the plunger position as a continuous line. The associated ordinate scales 21', 22' can be seen at the left side of FIG. 2. Furthermore, on an ordinate scale 23' enlarged by comparison therewith, the time curve of a differential value 23 is shown that indicates the deviation of the actual value 21 from the desired value 22. As is generally known, this trailing of the actual value is also called drag error for electronically controlled linear motors 6.

Shown is also a threshold value 24 which serves as a comparison value for the differential value 23 to detect the establishment of the contact of the plunger 5 with the article 1. The curve shape at the contact position 16 is also outlined for better understanding. The time is indicated in milliseconds on the abscissa. In the example, the first contact is detected at a time $t_K$, and the further advance movement by the desired stroke 10 is initiated within a period $T_C$ needed for calculating the end position 17. Preferably, the desired stroke 10 is initiated as fast as possible after detection of the first contact, i.e. only delayed by the process time needed for calculating the end position 17 in consideration of the respectively present blind stroke 15.

Figure 3:
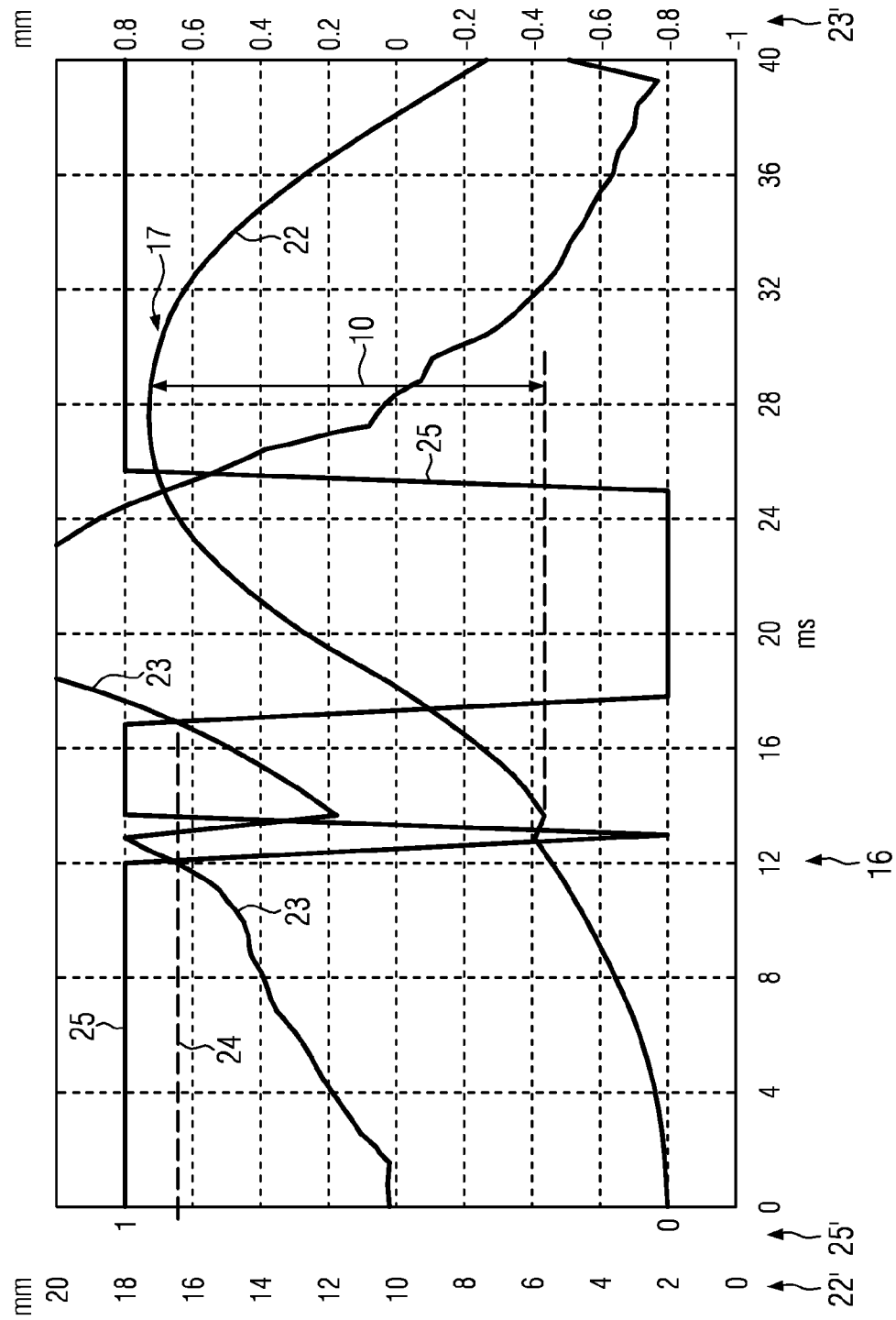
FIG. 3 illustrates the time curve of parameters according to the present disclosure upon initiation of a desired stroke.

The initiation of the desired stroke 10 according to the present disclosure is illustrated in FIG. 3. Thus a logic level 25 changes whenever the differential value 23 reaches the predetermined threshold value 24. The first contact of the plunger 5 with the article 1 is thereby detected and the logic level 25 is changed (associated ordinate scale is designated by 25'). It serves as a trigger signal for extending the plunger 5 by the desired stroke 10 up and into its end position 17. The threshold value 24 represents a value of the drag error or the differential value 23 that is typical of the establishment of the contact. As illustrated by the examples in FIG. 2 and FIG. 3, the recognition of the first contact and the initiation of the desired stroke take place preferably within 2 ms, particularly within 1 ms.

Instead of the illustrated example, other typical measurement signal variations could also be used for detecting the first contacting according to the invention of the article to be rejected. For instance a specific power consumption of the drive provided on the pusher 4 would be conceivable. For instance, the current consumption of the linear motor 6 could be monitored. When an associated threshold value is exceeded, one can draw the conclusion that the resistance put up by the article 1 against the pusher 4 is responsible for the rise of the current consumption of the linear motor 6. Likewise, typical current time curves could be determined and serve as a reference for an actual current curve measured upon extension of the plunger 5. Likewise, speed values or acceleration values of the plunger 5 could in principle be used as criteria for the recognition of the first contact. Furthermore, additional pressure sensors (not shown) would be possible on the plunger 5 or on a pusher plate provided on the plunger 5.

In comparison therewith, the embodiment described with respect to the drag error has however the advantage that measurement signals that are available at any rate due to the electronic control of the linear motor 6 can be used in addition to the recognition of the first contact according to the present disclosure. The measured actual current consumption of the linear motor 6 could here be compared by analogy with the illustrated example with desired values for the current consumption and evaluated in the form of differential curves, by comparison with threshold values, or the like.

Figure 4:
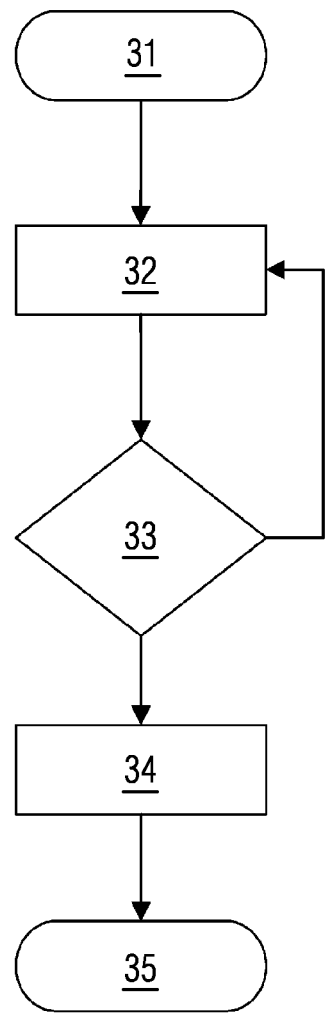
FIG. 4 is a schematic flow diagram of the method according to the present disclosure.

A preferred method sequence is schematically shown in FIG. 4. After identification of an article 1 to be rejected in a step 31, the pusher 4 is extended in a step 32, starting from its inoperative position 13. During extension of the plunger 5 at least one measurement signal according to the invention, for instance the actual value 21 of the plunger position, is continuously recorded.

In a calculating and comparing step 33 which is directly subsequent thereto, it is checked e.g. on the basis of the signals shown in FIGS. 2, 3 whether a first contact has been established between the plunger 5 and the article 1. If such a contact is not detected, step 32 is again carried out. By contrast, if a contact is detected, a control signal is triggered during the continued extension of the plunger 5 in a step 34, whereupon starting from the detected first contact the desired stroke 10 is carried out. In step 35, the advance movement of the pusher 4 ends when the end position 17 has been reached, conforming to a desired position for rejecting the article 1. Steps 32 to 34 are here carried out during the continuous advance movement of the plunger 5.

Both a rise in the drag error and a rise in the current consumption of the pusher 4 represent load-dependent measurement signals. The signal rise is each time caused by a mechanical resistance put up against the plunger 5 during the advance movement. The method according to the present disclosure is correspondingly suited particularly for glass bottles, for filled plastic bottles, or the like, that put up a sufficiently great resistance against the pusher due to their mass inertia.

Both the detection of the first contact according to the present disclosure between the plunger 5 and the article 1 to be rejected and the subsequently performed desired stroke 10 can be adapted depending on the type. For instance, in the case of containers, or the like, with a comparatively small diameter, rather large variation widths 12 of the conveying distance may be present. Likewise, the desired stroke 10 could e.g. be adapted to rather large container diameters to avoid any pressing of such a container against a boundary railing at the end of the stroke.

The articles 1 to be rejected are particularly bottles for products in the food sector, pharmacy, cosmetics, hygiene, or the like. Test bodies would also be possible that are used e.g. in routine tests in filling facilities and must be rejected selectively from the product stream.

The described method is in principle suited for very different pushers, irrespective of whether these comprise e.g. an internal drive, an external drive, internal or external position encoders, a linear lift mechanism or a pivot mechanism.

It is essential for the invention that an establishment of the first contact between the respective pusher and the article to be rejected is metrologically detected, and that the desired stroke is carried out starting from the detected first contact. Hence, errors caused by varying blind strokes for individual articles can be avoided or at least reduced to a negligible degree. The respective divert stroke is thus determined individually for each individual article to be rejected and/or is corrected.

What is claimed is:

1. A method for rejecting an article, particularly a bottle, from a sequence of articles by means of a pusher from a conveyor belt, wherein a measurement signal for detecting a first contact between the pusher and the article to be rejected is monitored and the pusher carries out a desired stroke, starting from the first contact, and wherein the measurement signal is evaluated at periodically repeated intervals and the start of the desired stroke is initiated within not more than 2 ms after detection of the first contact.

2. The method according to claim 1, wherein the measurement signal is periodically recorded at least within a blind stroke of the pusher towards the article.

3. The method according to claim 1, wherein the first contact is detected during the continuous advance movement of the pusher.

4. The method according to claim 1, wherein the measurement signal is an actual value of the pusher which is typical of the position or the movement of a plunger provided on the pusher or of a resistance put up against the plunger.

5. The method according to claim 4, wherein the actual value curve is compared with the curve of a desired value.

6. The method according to claim 5, wherein the desired value curve is predetermined in response to at least one of a dimension or a the mass of the article.

7. The method according to claim 5, wherein differential values are calculated from actual values and desired values corresponding in time.

8. The method according to claim 7, wherein the differential values are compared with at least one threshold value which is typical of the establishment of the first contact between the plunger and the article.

9. The method according to claim 1, wherein a drag error between a desired position of the pusher and an actual position of the pusher is calculated from the measurement signal.

10. The method according claim 1, wherein the article is a glass bottle or a filled plastic bottle.

11. The method according to claim 1, wherein the pusher is driven by a position-controlled linear motor.

12. The method according to claim 1, wherein a total stroke for rejecting the article starting from an inoperative position of the pusher for passing through the sequence of articles is determined individually for the article.

\* \* \* \* \*